Dec. 14, 1948. E. F. SCHODER 2,456,329
DUST SEPARATOR EQUIPMENT
Filed Oct. 12, 1945
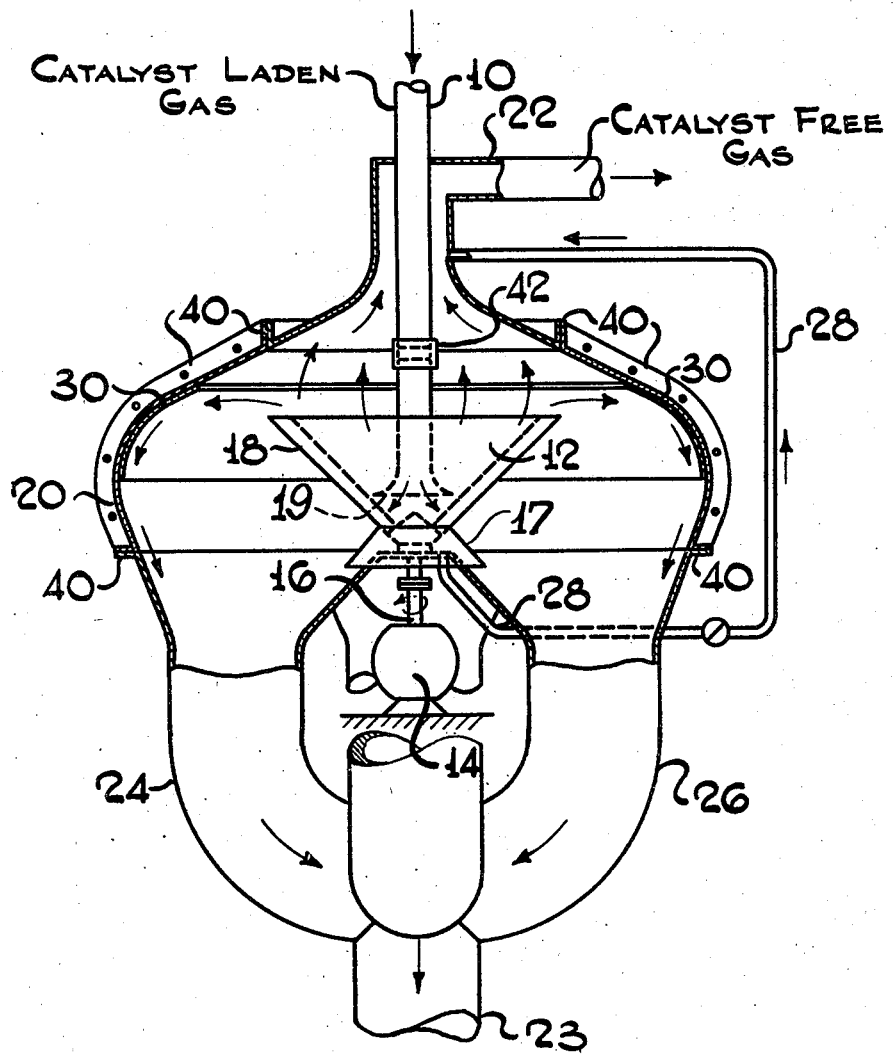
Erlo F. Schoder Inventor Patented Dec. 14, 1948

2,456,329

UNITED STATES PATENT OFFICE 2,456,329

DUST SEPARATOR EQUIPMENT

Erlo F. Schoder, Union, N. J., assignor to Standard Oil Development Company, a corporation of Delaware Application October 12, 1945, Serial No. 622,072

1 Claim. (Cl. 183—77)

This invention relates to equipment for separating finely divided solids from suspension in gaseous fluids, and in particular to the separation of finely divided solids from the gas-solid dispersions employed in petroleum refining processes.

Processing equipment employing fluidized masses are now widely employed in petroleum refining. The catalyst material after the cracking reaction is usually separated from the fluidized masses by the centrifugal action induced as a result of the suspension contacting tangentially at high velocity stationary vanes held in suitable enclosures. The separation occurs as a result of the outwardly whirling motion thus imparted to the fluidized masses. By this means, complete separation of the solid material from the gaseous fluids is not effected. Moreover, this use of stationary vanes involves rapid erosion of the vanes due to the destructive force of the fast-moving catalyst particles. Replacement of the vanes is indeed an important feature in this type of operation. Replacement of the vanes is costly and involves an appreciable time element. In the equipment of the present invention, more complete separation of the finely divided solid material occurs as a result of centrifugal action induced by mechanical means. The particular means employed, moreover, permit of the separation of finely divided materials from fluidized masses such as occur in petroleum refinery units in a ready and easy manner without the excessive erosion difficulties experienced in prior equipment.

It is an object of the present invention to furnish equipment which will serve to separate more completely, and less expensively than the stationary vane type equipment, the finely divided solid particles from fluidized masses and gases, such as occur in the treatment of petroleum fractions in catalytic cracking units and in dust-laden atmospheres. Another object of the invention is to furnish equipment upon which erosion due to finely divided solids will not involve expensive replacements and frequent processing shutdowns such as are necessary with prior art equipment. With these and other objects in view as may appear from the accompanying specification, the invention consists of various features of construction and combination of parts which will be described in connection with the accompanying drawing in which preferred embodiments of the invention are illustrated.

The drawing is a cross-sectional elevational view of an embodiment of the invention adapted for the treatment of fluidized masses from a petroleum refinery unit.

As illustrated, the stream of finely divided catalyst-laden gas from a catalytic cracking unit passes through pipe 10 and is ejected into a bowl 12 which is capable of rotation through the activity of the motor or turbine 14 to which it is connected by means of the rod 16. The bowl 12 is of inverted conical shape with vane type plates 18, as raised members extending from the top to near the bottom of the bowl. A conical member 17 forms the base of the separator bowl and serves to deflect materials discharged into the bowl to the inner walls of the latter. The inlet pipe 10 which is terminated just above the conical member 17 is flared at its end 19 for smooth discharge of incoming material against the base of the bowl. The bowl 12 is encompassed within a large vessel or casing 20. The upper portion of vessel 20 is constricted and terminates in pipe 22 at right angles to the main axis of the enclosure. The lower portion is also constricted, forming a solids exit line 23. The lower portion of the vessel 20 is of multiple U shaped construction having limbs 24 and 26 and two others, one of which is shown behind the motor or turbine 14. The other limb, which would be directly in front of the driver, has been broken away for clarity. The rod 16 connecting the motor 14 with the bowl 12 passes through the upper end of the multiple U portion of the vessel 20. A pipe 28 connects the upper portion of the multiple U with the upper portion of the enclosure 20 below the pipe 22. On the inside of the vessel 20 surrounding the bowl 12 are replaceable plates 30 lining the inside of the vessel 20 within the vicinity of the bowl 12. The unit is fabricated by a series of flanges 40. Either a coupling 42 or similar arrangement is provided to permit ready removal of the bowl by first removing the lower portion of pipe 10.

The operation of the illustrated device involves that the catalyst-laden gas is passed through the pipe 10 onto the inside of the bowl 12 which is rotated by the motor or turbine 14. The centrifugal action causes the heavy catalyst particles to be ejected against the wear plates 30 lining the inside of the vessel 20, while the gas, being lighter, passes upwards through the central portion of the apparatus and is removed through the pipe 22. Any gas occluded in the separated solid material escapes by means of piping 28 to the upper portion of the vessel 20 just below the gas exit line 22.

The embodiment illustrated is presented to illustrate the principle of the invention, namely, that by centrifugal action relatively complete separation of finely divided solids from fluidized-solid masses from the fluid portion may be made. The shape of the bowl, the nature and location of the impeller, the type of baffle, and the contour of the outer shell as shown present merely particular embodiments and not restrictions of the invention. Thus, other shapes and contours, including also the additional use of impellers and baffles, are contemplated within the scope of the invention. The removable wear plates 30 may be fabricated in sections and made of glass, stellite or other hard-surfaced material. The bowl illustrated may be equipped with a removable liner and blades made from similar materials. The equipment of the invention may be employed alone or in a number of smaller units to separate the finely divided solids from fluidized masses as commonly employed in petroleum refining units. The equipment is easily constructed and capable of simple replacements. Moreover, these replacements can be made quickly and at relatively low cost. Furthermore, if more than one unit is provided, replacements may be made upon one unit without the necessity for a processing shutdown.

What is claimed is:

Apparatus for separating finely divided solid materials from gaseous carrier materials comprising a housing, outlet means for the withdrawal of gaseous materials substantially free of solid materials arranged centrally of the top portion of said housing, a rotatable separator bowl of inverted substantially conical shape arranged centrally of the said housing, a plurality of vanes arranged on the inner walls of said rotatable separator bowl, a conical member forming the base of said separator bowl for deflecting materials to the inner walls of said separator bowl, inlet pipe means for the supply of mixtures of finely divided solid materials and gaseous carrier materials to said separator bowl, said inlet pipe means being arranged centrally of the rotatable separator bowl and being flared at its lower end for smooth discharge of incoming mixture directly against said conical member forming the base of said separator bowl, means for rapidly rotating said separator bowl and means for withdrawing separated solid materials from the bottom portion of said housing.

ERLO F. SCHODER.

REFERENCES CITED

The following references are of record in the file of this patent:

UNITED STATES PATENTS

| Number | Name | Date |
|---|---|---|
| 309,336 | Condict | Dec. 16, 1884 |
| 405,674 | Morse | June 18, 1889 |
| 2,250,757 | Fisher | July 29, 1941 |

FOREIGN PATENTS

| Number | Country | Date |
|---|---|---|
| 318,648 | Great Britain | Sept. 9, 1929 |
| 650,048 | Germany | Sept. 10, 1937 |